(12) United States Patent
Watson et al.

(10) Patent No.: US 10,883,914 B2
(45) Date of Patent: Jan. 5, 2021

(54) FLOW CYTOMETRY SYSTEMS INCLUDING AN OPTICAL ANALYSIS BOX FOR INTERFACING WITH AN IMAGING DEVICE

(71) Applicant: Blaire Biomedical, LLC, Angola, IN (US)

(72) Inventors: Melanie G. Watson, Avilla, IN (US); Paul J. Carlquist, Warsaw, IN (US)

(73) Assignee: Blaire Biomedical, LLC, Angola, IN (US)

( * ) Notice: Subject to any disclaimer, the term of this patent is extended or adjusted under 35 U.S.C. 154(b) by 0 days.

(21) Appl. No.: 16/534,613

(22) Filed: Aug. 7, 2019

(65) Prior Publication Data

US 2020/0049616 A1    Feb. 13, 2020

Related U.S. Application Data

(60) Provisional application No. 62/715,483, filed on Aug. 7, 2018.

(51) Int. Cl.
*G01N 15/14* (2006.01)

(52) U.S. Cl.
CPC ..... *G01N 15/1434* (2013.01); *G01N 15/1425* (2013.01)

(58) Field of Classification Search
CPC . G01N 15/14; G01N 15/1434; G01N 15/1425

USPC .......................................................... 356/39
See application file for complete search history.

(56) References Cited

U.S. PATENT DOCUMENTS

| 9,322,767 B2 | 4/2016 | Ehrenkranz | |
|---|---|---|---|
| 2001/0029793 A1* | 10/2001 | Moler | G01N 1/34 73/863.22 |
| 2006/0192940 A1* | 8/2006 | Phi-Wilson | G01N 15/1463 356/73 |
| 2011/0312657 A1 | 12/2011 | Azimi et al. | |
| 2014/0152801 A1* | 6/2014 | Fine | G02B 21/0008 348/79 |
| 2017/0218425 A1 | 8/2017 | Chen et al. | |
| 2017/0227537 A1 | 8/2017 | Guo et al. | |
| 2018/0211380 A1 | 7/2018 | Tandon et al. | |
| 2018/0280977 A1 | 10/2018 | Baday et al. | |

* cited by examiner

*Primary Examiner* — Roy M Punnoose
(74) *Attorney, Agent, or Firm* — Taylor IP, P.C.

(57) ABSTRACT

An optical analysis box for a flow cytometry system that includes: a plurality of connected walls defining a volume; a connection interface associated with at least one of the walls and configured to connect with an imaging device; a sample receiver configured to hold a fluid sample in the volume; and an analysis region having an aperture configured to align with an imaging element of a connected imaging device, the analysis region being positioned such that gravity forces flow of the held fluid sample past the aperture for imaging by the imaging device.

20 Claims, 5 Drawing Sheets

FLOW CYTOMETRY SYSTEMS INCLUDING AN OPTICAL ANALYSIS BOX FOR INTERFACING WITH AN IMAGING DEVICE

CROSS REFERENCE TO RELATED APPLICATIONS

This is a non-provisional application based upon U.S. provisional patent application Ser. No. 62/715,483, entitled "SMARTMED CASE", filed Aug. 7, 2018, which is incorporated herein by reference.

BACKGROUND OF THE INVENTION

1. Field of the Invention

The present invention relates to flow cytometry systems, and, more particularly, to boxes for flow cytometry systems.

2. Description of the Related Art

Flow cytometry is a commonly used technique for cell counting. For example, flow cytometry can be used to analyze blood samples and help determine whether the patient providing the sample has one or more hematological conditions, such as anemia.

Traditionally, flow cytometry has been performed by large, stationary machines. Such machines are generally quite expensive, which limits the use of flow cytometry to facilities such as medical laboratories that perform flow cytometry tests often enough to warrant the expense of the machines. The limited use of flow cytometry tests makes the tests less affordable and accessible to patients.

What is needed in the art is a way to perform flow cytometry tests that addresses at least one problem of known flow cytometry machines.

SUMMARY OF THE INVENTION

The present invention provides an optical analysis box for a flow cytometry system that can connect to an imaging device and has an aperture that is positioned so gravity forces flow of a held sample past an aligned imaging device for imaging.

The invention in one form is directed to an optical analysis box for a flow cytometry system that includes: a plurality of connected walls defining a volume; a connection interface associated with at least one of the walls and configured to connect with an imaging device; a sample receiver configured to hold a fluid sample in the volume; and an analysis region having an aperture configured to align with an imaging element of a connected imaging device, the analysis region being positioned such that gravity forces flow of the held fluid sample past the aperture for imaging by the imaging device.

The invention in another form is directed to a flow cytometry system that includes: an imaging device having an imaging element, the imaging device being configured to analyze fluid flowing past the imaging element and determine the presence of at least one biological component in the analyzed fluid; and an optical analysis box coupled to the imaging device. The optical analysis box includes: a plurality of connected walls defining a volume; a connection interface associated with at least one of the walls and connected with the imaging device; a sample receiver holding a fluid sample in the volume; and an analysis region disposed in the volume, the analysis region having an aperture aligned with the imaging element such that gravity forces the held fluid sample to flow past the aperture for imaging by the imaging device.

The invention in yet another form is directed to a flow cytometry system that includes: an optical analysis box including: a plurality of connected walls defining a volume; a sample receiver configured to hold a fluid sample in the volume; a flow cytometer placed in the volume and configured to analyze a held fluid sample and determine the presence of at least one biological component in the analyzed fluid; an electrical power source electrically coupled to the flow cytometer; a device interface associated with at least one of the walls and configured to electrically couple with an electrical interface of a handheld device; and a dock interface associated with at least one of the walls, electrically coupled with the electrical power source, and configured to electrically couple with a docking interface of a docking station.

An advantage of the present invention is flowing held fluid samples past the imaging element with gravity reduces the power requirements and size of the optical analysis box because no separate pump is needed.

Another advantage is the optical analysis box can interface with handheld imaging devices, such as a smartphone, which are widely available and can be used to perform flow cytometry at reduced cost compared to traditional methods.

Yet another advantage is the optical analysis box can be used to interface a handheld device with a docking station to charge the handheld device while performing flow cytometry.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Referring now to the drawings, and more particularly to FIGS. 1-5, there is shown an exemplary embodiment of an optical analysis (OA) box 100 provided according to the present invention which generally includes a plurality of connected walls 101A, 101B, 101C that define a volume, a connection interface 110 associated with at least one of the walls, such as wall 101B, a sample receiver 120, and an analysis region 130. The OA box 100 may comprise, for example, a polymer material such as a thermoplastic, a metal material such as aluminum, and/or a ceramic such as glass. In some embodiments, the OA box 100 comprises multiple different materials. It should be appreciated that the OA box 100 can be formed by any suitable method of manufacturing, such as machining, molding, etc.

Figure 1:
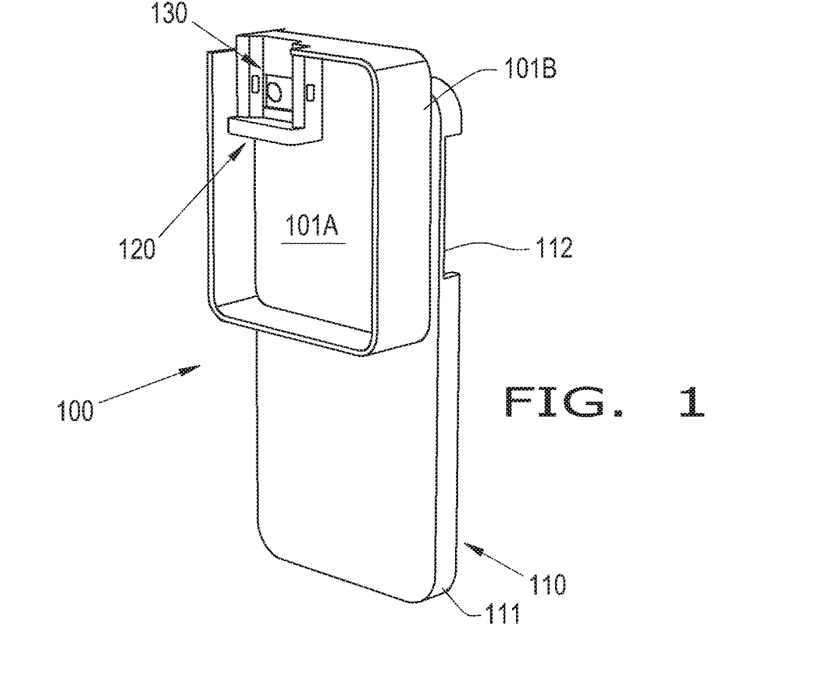
FIG. 1 is a perspective view of an exemplary embodiment of an optical analysis box provided according to the present invention.
Figure 2:
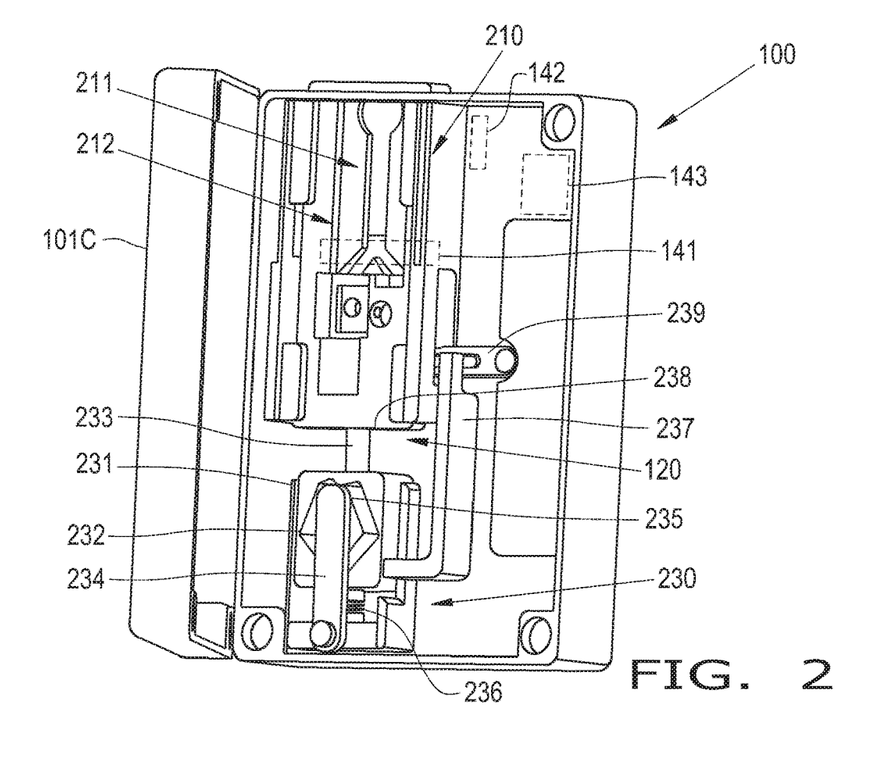
FIG. 2 is a perspective view of the optical analysis box of FIG. 1 holding additional components.
Figure 3:
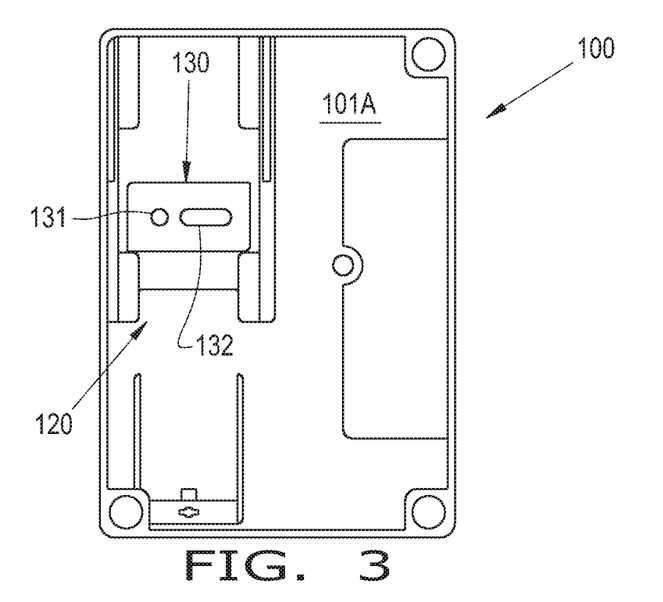
FIG. 3 is a front view of the optical analysis box illustrated in FIGS. 1 and 2 when open.

The walls 101A, 101B, 101C together define a volume; the walls 101A, 101B, 101C together may be referred to as a "base." The wall 101A may be a front wall, the walls 101B may be sidewalls, and the wall 101C may be a rear wall, with the sidewalls 101B connecting the front wall 101A to the rear wall 101C. It should be appreciated that references to "front," "rear," and "side" are for convenience of description only and are not intended to limit the present invention to any one configuration. The base formed by the walls 101A, 101B, 101C may be sized and shaped to hold a variety of components, such as components for performing flow cytometry, as will be described further herein.

Figure 4:
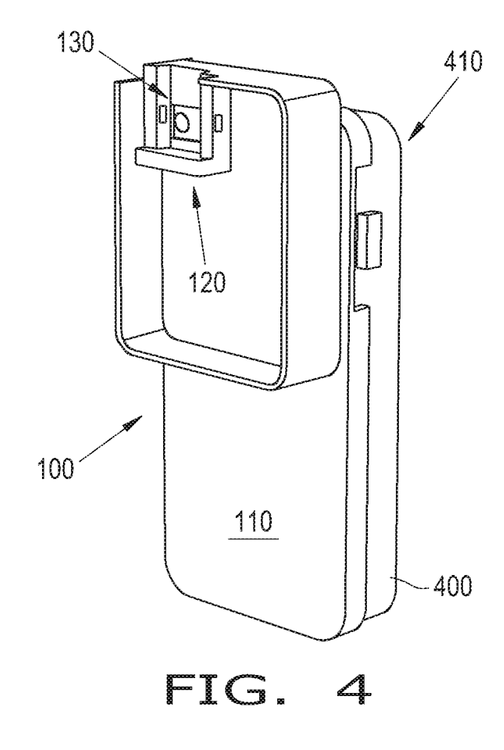
FIG. 4 is a perspective view of an exemplary embodiment of a flow cytometry system including the optical analysis box of FIGS. 1-3 connected with an imaging device in the form of a smart phone.
Figure 5:
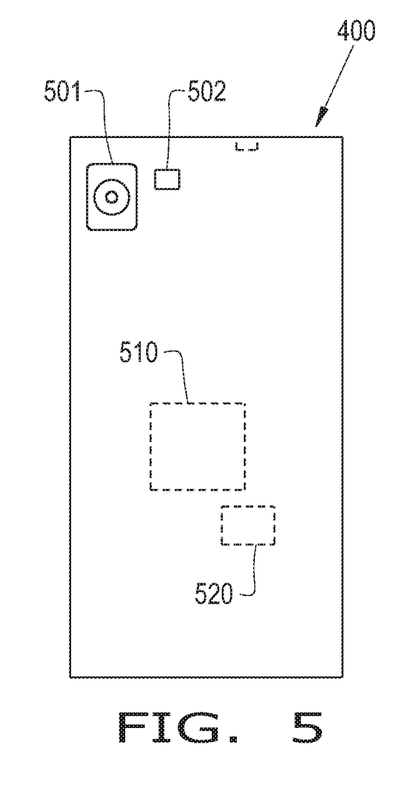
FIG. 5 is a rear view of the imaging device illustrated in FIG. 4.

The connection interface 110 is associated with at least one of the walls, such as the front wall 101A. As illustrated, the connection interface 110 is "associated with" the front wall 101A by being integrally formed with the front wall 101A, but it should be appreciated that the connection interface 110 can be associated with the front wall 101A, or one or more of the other walls 101B, 101C, in other ways such as by physical connection using one or more fasteners, adhesion using an adhesive, etc. The connection interface 110 has a generally rectangular shape with rounded corners 111 and a cutout 112. The connection interface 110 is configured to connect with an imaging device, such as a smart phone 400 as illustrated in FIG. 4, to form a flow cytometry system 410 including the OA box 100 and the imaging device 400. In some embodiments, the OA box 100 has approximately the same width as the connected imaging device 400. The connection interface 110 may connect with the imaging device 400 by, for example, fitting over the imaging device 400 to form a press fit connection. As illustrated in FIG. 4, for example, the connection interface 110 may be a case for a smart phone 400, allowing the connection interface 110 to both connect the OA box 100 to the smart phone 400 while simultaneously protecting the smart phone 400 from various types of damage. In some embodiments, the connection interface 110 may include a connector or other feature that can interface with a respective interface of the imaging device 400, such as a headphone jack or universal serial bus (USB) port. Since many different types of imaging devices, such as smart phones, are known, it should be appreciated that the shape of the connection interface 110 can be adjusted to connect with one or more different types of imaging devices. For example, the connection interface 110 can be shaped to connect to a specific imaging device or to a number of different imaging devices that have similar shapes.

The sample receiver 120 is configured to hold a fluid sample in the volume. The sample receiver 120 may hold, for example, a cartridge 210 in the volume, with the cartridge 210 holding the sample for analysis. The sample receiver 120 may comprise, for example, a push-push mechanism 230, as will be described further herein.

The analysis region 130 has an aperture 131 that is configured to align with an imaging element, such as a camera 501 (illustrated in FIG. 5), of a connected imaging device, such as the connected smart phone 400 illustrated in FIG. 4. As illustrated in FIG. 3, the aperture 131 may be formed through the front wall 101A with a circular shape. The aperture 131 may be shaped differently to correspond to different imaging elements, i.e., the size of the aperture 131 can be increased or decreased to account for a different lens size of the imaging element. In some embodiments, the analysis region 130 includes a light aperture 132 that is spaced from the aperture 131. The light aperture 132 may be formed through the front wall 101A and be configured to align with a light source 502 (illustrated in FIG. 5) of a connected imaging device, such as the connected smart phone 400 illustrated in FIG. 4. It should be appreciated that the placement and shape of the aperture 131, as well as the light aperture 132 if included, may be adjusted so the apertures 131, 132 align with the imaging element 501 and the light source 502 of a connected imaging device. It should thus be understood that the analysis region can be configured in many different ways so the apertures 131, 132 align with the corresponding element of a connected imaging device.

The imaging device 400 includes a processor 510 and a memory 520 (illustrated in FIG. 5) that is coupled to the processor 510 and stores instructions, which might be in the form of software code, to control various elements of the imaging device 400, such as the imaging element 501 and light source 502, for analyzing fluid flowing past the imaging element 501 and determining the presence of at least one biological component in the analyzed fluid, such as various types of blood cells. In some embodiments, the instructions allow the imaging device 400 to analyze flowing fluid to count the number of red blood cells, white blood cells, and/or platelets. In some embodiments, the instructions for performing flow cytometry are initiated in a program, which may be in the form commonly referred to as an "app," that is stored in the memory 520 to provide a user with a simple, intuitive way to perform flow cytometry after loading a sample in the sample receiver 120. Instructions and devices for performing various types of flow cytometry are known, so further description is omitted for brevity.

Flow cytometry depends on fluid containing substances of interest, such as various types of cells, flowing past an imaging element. Known flow cytometer systems generally incorporate some type of element, such as a pump, to cause a fluid sample to flow past the imaging element of the imaging device. While pumps are effective to flow the sample past the imaging element, incorporating a pump has various drawbacks. For instance, the pump generally produces waste heat that may add to the waste heat load and need to be managed; in the case of biological samples, heat management is crucial to avoid damaging the integrity of the sample. Further, the pump can take up significant amounts of space, reducing the portability of the flow cytometer. Even further, the pump generally draws electrical energy, which can reduce the effective duration of an electric power source, such as a battery, powering the flow cytometer before needing to be replaced or recharged.

To address some of the previously described issues, and referring to FIGS. 1-4, the analysis region 130 of the OA box 100 is positioned such that gravity forces flow of the held fluid sample, which may be in a cartridge 210 held by the sample receiver 120, past the aperture 131 for imaging by the imaging device 400. In the illustrated embodiment, the analysis region 130 and aperture 131 are positioned vertically in line and below the sample receiver 120 when the OA box 100 and the imaging device 400 are held upright, allowing flow of the held fluid sample toward the aperture 131. Since the aperture 131 is aligned with the imaging element 501, flow of the held fluid sample past the aperture 131 enters the visual field of the imaging element 501 and allows the imaging device 400 to, for example, visualize and count the number of cells in the sample. Such a configuration allows the fluid to passively flow past the aperture 131 and aligned imaging element 501 for imaging, which reduces or eliminates the need for a separate element to generate the fluid flow.

Figure 6:
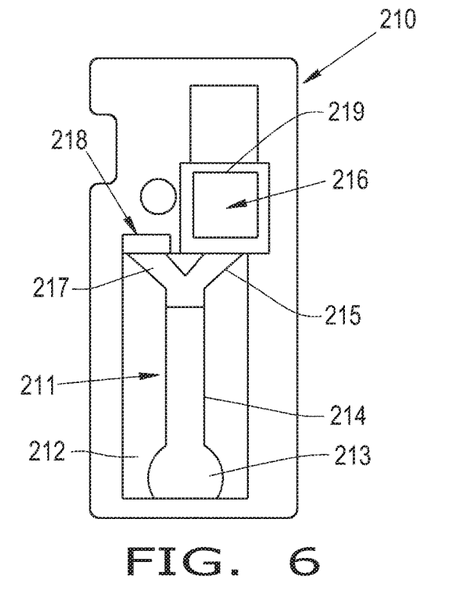
FIG. 6 is a front view of an exemplary embodiment of a cartridge provided according to the present invention and held in the optical analysis box illustrated in FIGS. 1-4.
Figure 7:
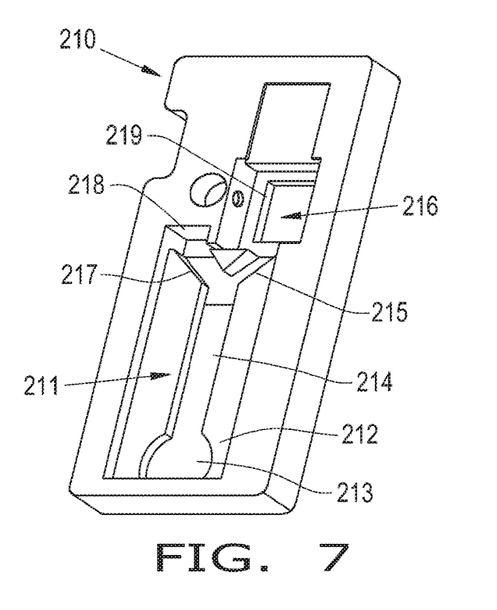
FIG. 7 is a perspective view of the cartridge illustrated in FIG. 6.

In some embodiments, the OA box 100 includes a flow channel 211, which may be a part of the cartridge 210, that is configured to allow flow of the fluid sample through the flow channel 211 and past the aperture 131. The entire interior of the cartridge 210 may be a sealed environment so the cartridge 210 is a disposable sample holder that can be removed from the sample receiver 120 and discarded after the sample is analyzed, which can eliminate the need to sanitize and sterilize the OA box 100 between uses. As illustrated in FIGS. 2 and 6-7, the flow channel 211 may be formed in a recessed region 212 of the cartridge 210 and include an entry region 213 that is fluidly coupled to a Y-shaped flow path. The Y-shaped flow path may have a main branch 214 that separates into an analysis branch 215, which is fluidly coupled to an imaging region 216 that aligns with the analysis region 130 and the aperture 131 when the cartridge 210 is seated in the sample receiver 120, and a separate branch 217 that is fluidly coupled to a terminal region 218. The imaging region 216 may have a cartridge aperture 219 that is formed through the cartridge 210 and sealed by, for example, a glass or other transparent material.

The imaging region 216 may be fluidly coupled to a reagent well, illustrated as a circular well formed adjacent to the imaging region 216, that can hold a reagent pack. For example, the reagent pack can be a blister pack that contains cellular stains and fluorescent dyes. When the fluid sample is loaded in the sample receiver 120 and flowing toward the analysis region 130, the loaded reagent pack can be burst so the stains and/or dyes flow into the imaging region 216 to stain cells in the fluid sample for optical analysis. It should be appreciated that a separate reagent well is optional and the reagent(s) can, for example, be loaded directly into the flow channel 211 and/or the imaging region 216 for uptake by the cells as the cells flow into the imaging region 216.

Figure 8:
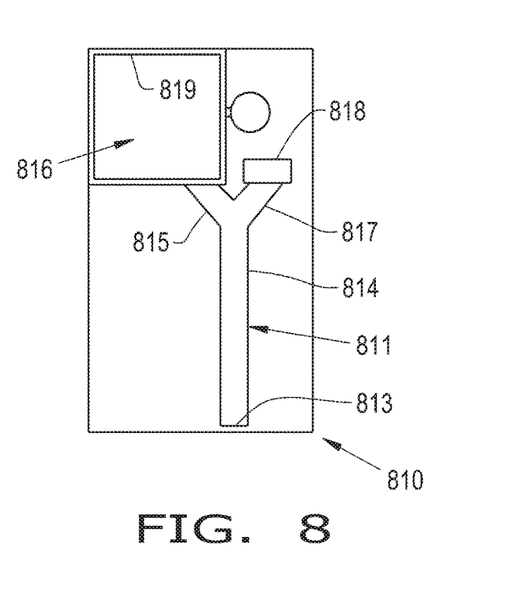
FIG. 8 is a front view of another exemplary embodiment of a cartridge for holding a fluid sample provided according to the present invention.
Figure 9:
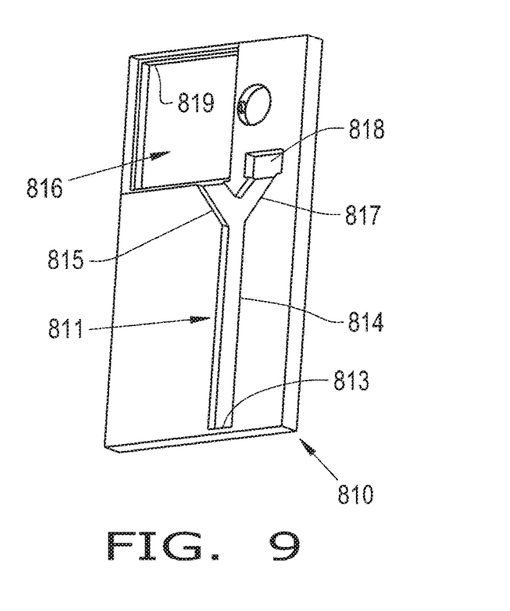
FIG. 9 is a perspective view of the cartridge illustrated in FIG. 8.

Referring now to FIGS. 8-9, another exemplary embodiment of a cartridge 810 that may hold a sample is illustrated. Similarly to the previously described cartridge 210, the cartridge 810 may have a flow channel 811 formed therein and include an entry region 813 coupled to a Y-shaped flow path with a main branch 814 that separates into an analysis branch 815 and a separate branch 817. The analysis branch 815 is fluidly coupled to an imaging region 816 that aligns with the analysis region 130 and the aperture 131 when the cartridge 810 is seated in the sample receiver 120. The separate branch 817 is fluidly coupled to a terminal region 818. The imaging region 816 may have a cartridge aperture 819 that is formed through the cartridge 810 and sealed by, for example, a glass or other transparent material.

Figure 10:
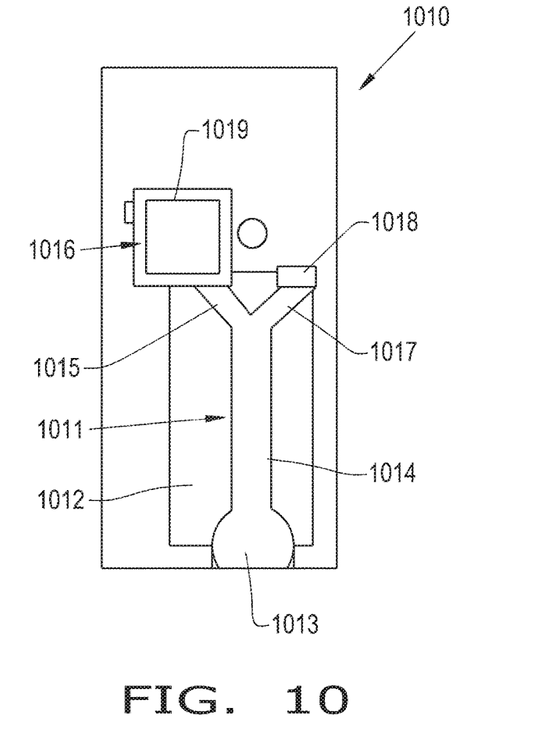
FIG. 10 is a front view of yet another exemplary embodiment of a cartridge for holding a fluid sample provided according to the present invention.
Figure 11:
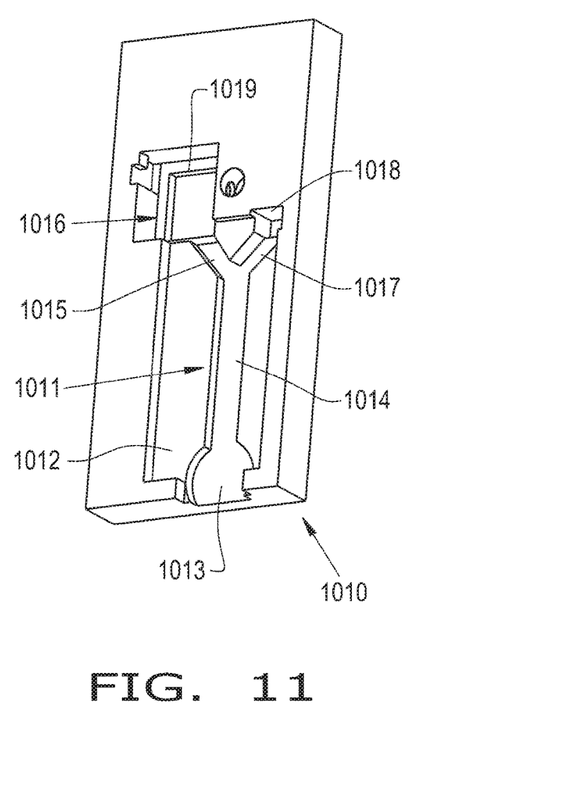
FIG. 11 is a perspective view of the cartridge illustrated in FIG. 10.

Referring now to FIGS. 10-11, yet another exemplary embodiment of a cartridge 1010 that may hold a sample is illustrated. Similarly to the previously described cartridges 210, 810, the cartridge 810 may have a flow channel 1011 formed in a recessed region 1012 and include an entry region 1013 coupled to a Y-shaped flow path with a main branch 1014 that separates into an analysis branch 1015 and a separate branch 1017. The analysis branch 1015 is fluidly coupled to an imaging region 1016 that aligns with the analysis region 130 and the aperture 131 when the cartridge 1010 is seated in the sample receiver 120. The separate branch 1017 is fluidly coupled to a terminal region 1018. The imaging region 1016 may have a cartridge aperture 1019 that is formed through the cartridge 1010 and sealed by, for example, a glass or other transparent material.

To assist in separating desired cell types for counting from undesired cell types, the OA box 100 may include a pair of conductive plates 141, which may comprise copper or other conductive materials, that are disposed on opposite sides of the sample receiver 120. In other words, the conductive plates 141 are placed in the volume at locations on opposite sides of a fluid sample held by the sample receiver 120, such as a fluid sample held in an inserted cartridge. The conductive plates 141 are coupled to a voltage source 142, which may be a battery, in order to generate an electric field that redirects biological components in the fluid sample that are flowing toward the aperture 131, as is known to those skilled in the art of flow cytometry. In some embodiments, the conductive plates 141 are indirectly coupled to the voltage source 142 via a controller 143 or other element that controls the electric field generated by the conductive plates 141 to affect the separation of cells during imaging and analysis. The controller 143 may be a general controller that controls various aspects of the OA box 100 or a specific controller that only controls the electric field generated by the conductive plates 141. Using conductive plates to generate electric fields for cell separation is known in the art, so further description is omitted for brevity.

Figure 12:
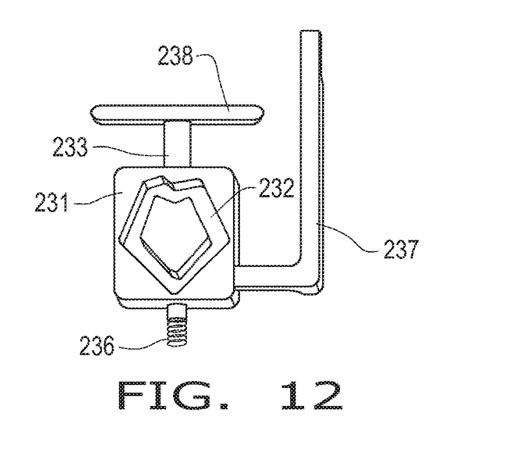
FIG. 12 is a perspective view of an exemplary embodiment of a portion of a sample receiver provided according to the present invention and held in the optical analysis box illustrated in FIGS. 1-4.

To hold the fluid sample, such as a cartridge 210, 810, 1010 holding the fluid sample, the sample receiver 120 may include a push-push mechanism 230, which may also be referred to as a "push-push latch," that interfaces with the cartridge 210 to removably hold the cartridge 210, 810, 1010 in the proper location and orientation. Referring specifically to FIGS. 2 and 12, it is illustrated that the push-push mechanism 230 includes a runway 231 defining a lever channel 232, a rod 233 bearing on the runway 231, a lever 234 with a portion 235 placed in the lever channel 232, a spring 236 urging the runway 231 toward a first position, which may be an unloaded position, and a post 237 carried by the runway 231. Similar to known push-push latches, the rod 233 can be coupled to a plate 238 placed adjacent to the analysis region 130. When the cartridge 210, 810, 1010 is inserted in the analysis region 130, the plate 238 is pushed in a direction opposite to the urging direction of the spring 236 so the runway 231 moves in the against the urging direction of the spring 236. For example, if the spring 236 is a compression spring, movement of the runway 231 against the urging direction of the spring 236 moves the runway 231 toward the spring 236. As the runway 231 moves, the portion 235 of the lever 234 in the lever channel 232 follows the lever channel 232 to move between a first resting position, which may be an unloaded resting position, to keep the runway 231 in the first position and a second resting position, which may be a loaded resting position, to keep the runway 231 in a second position, as is known. Movement of the runway 231 moves the post 237, which can pivot a gate 239 to lock and unlock the cartridge 210 in the sample receiver 120. It should be appreciated that while the sample receiver 120 is illustrated and described as including the push-push mechanism 230 to hold a fluid sample, other types of sample receivers, such as simple slots with or without a locking mechanism, may be incorporated in the OA box 100 according to the present invention.

From the foregoing, it should be appreciated that the previously described flow cytometry system 410 incorporating the OA box 100 is a portable system that performs flow cytometry. Since the system 410 is portable, the system 410 can be used in a wide variety of settings, such as point of care settings, to perform flow cytometry. Performing flow cytometry at the point of care, rather than in a laboratory, can provide for faster, more accurate test results by eliminating the need to transport the sample to a specialized laboratory. Further, reducing or eliminating the need for a pump in the system to flow the fluid sample reduces the size, heat production, and electrical power requirements of the flow cytometry system 410.

Figure 13:
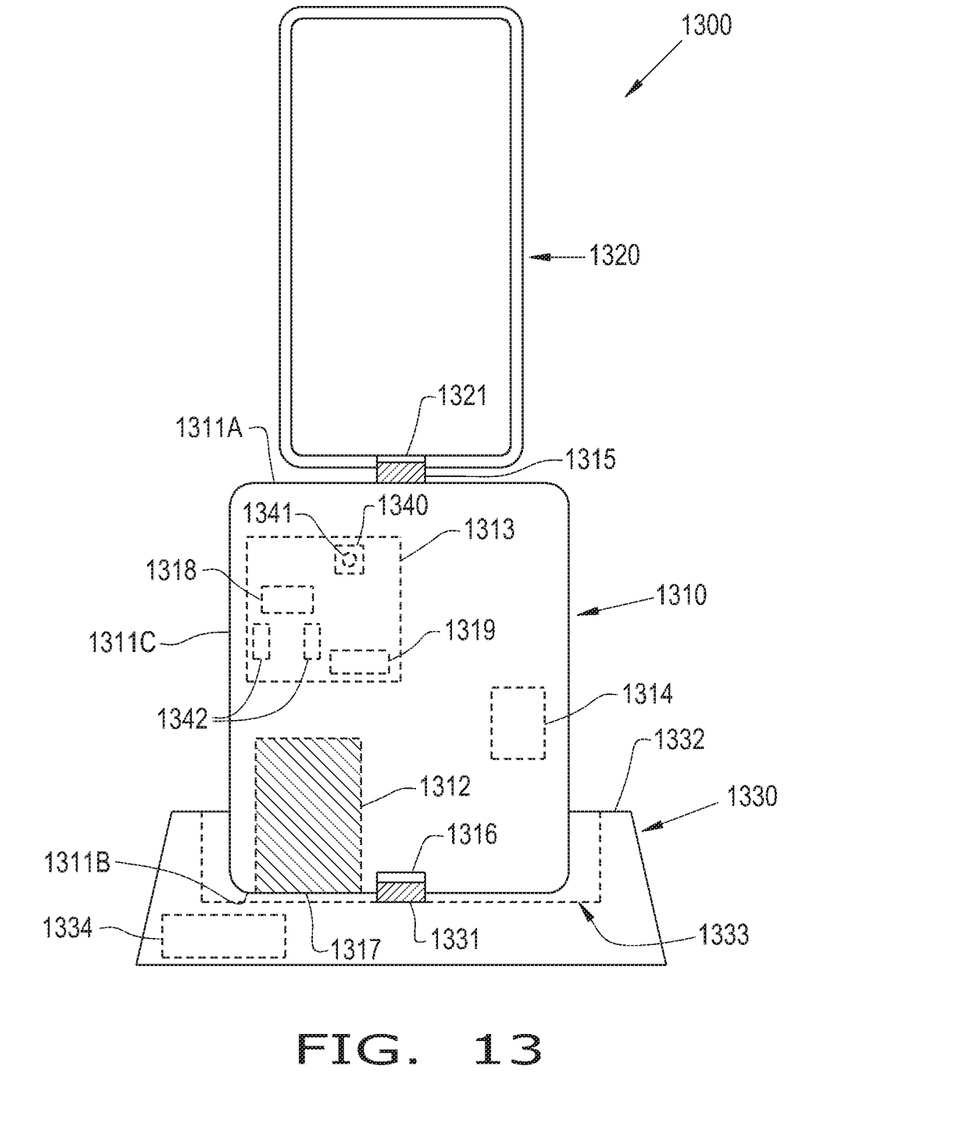
FIG. 13 is a front view of another exemplary embodiment of a flow cytometry system provided according to the present invention and including an optical analysis box electrically coupled to a handheld device and a docking station.

Referring now to FIG. 13, another exemplary embodiment of a flow cytometry system 1300 provided according to the present invention is illustrated that includes an optical analysis (OA) box 1310, a handheld device 1320 electrically coupled with the OA box 1310, and a docking station 1330 cradling the OA box 1310. The OA box 1310 includes connected walls 1311A, 1311B, 1311C defining a volume, a sample receiver 1312 that is configured to hold a fluid sample, such as one held in a cartridge, in the volume, a flow cytometer 1313 placed in the volume, an electrical power source 1314 coupled to the flow cytometer 1313, a device interface 1315 associated with at least one of the walls 1311A, and a dock interface 1316 associated with at least one of the walls 1311B. As illustrated, the connected walls 1311A, 1311B, 1311C may form a rectangular box shape to hold components of the OA box 1310. In some embodiments, the connected walls 1311A, 1311B, 1311C form a box that is at least one of wider, thicker, or taller than the handheld device 1320, which may be a smart phone, tablet computer, or other electronic device.

The sample receiver 1312 holds a fluid sample in the volume for analysis by the flow cytometer 1313. The sample receiver 1312 may include, for example, a push-push mechanism similar to the previously described push-push mechanism 230 that can hold a sample-containing cartridge or other element for analysis. In some embodiments, the sample receiver 1312 is held entirely within the volume and allows insertion of a cartridge through a cartridge slot 1317 formed in one of the walls 1311A, 1311B, 1311C. It should be appreciated that many different types of sample receivers may be incorporated in the OA box provided according to the present invention, with the previously described sample receiver including a push-push mechanism being just one exemplary sample receiver.

The flow cytometer 1313 is placed in the volume and configured to analyze a held fluid sample and determine the presence of at least one biological component. The flow cytometer 1313 may generally include an imaging element 1318, such as a camera, configured to capture images of flowing biological components, a pump 1319 configured to flow the held fluid sample into the field of vision of the imaging element 1318, and a processor 1340 that includes a memory 1341 and is configured to control various elements of flow cytometer 1313. The processor 1340 may, for example, be electrically coupled to the imaging element 1318 and the memory 1341, which may store instructions in the form of software code that the processor 1340 utilizes to control the various elements of the flow cytometer 1313. The flow cytometer 1313 may also include a pair of conductive plates 1342 to assist with separating cells from one another during analysis. Such flow cytometers are known, so further description is omitted for brevity.

The electrical power source 1314 is coupled to the flow cytometer 1313 to deliver electrical power required by the flow cytometer 1313 to operate. The electrical power source 1314 may include, for example, a battery that is held within the volume. Exemplary batteries include, but are not limited to, rechargeable batteries such as lithium-ion batteries. In some embodiments, the electrical power source 1314 includes an electrical circuit that can draw electrical power and distribute the drawn power to the flow cytometer 1313 and other elements of the OA box 1310; in such embodiments, the electrical power source 1314 may include a battery connected to the electrical circuit.

The device interface 1315 is associated with one at least one of the walls 1311A, 1311B, 1311C and is configured to electrically couple with an electrical interface of a handheld device, such as an electrical interface 1321 of the handheld device 1320. The device interface 1315 may be, for example, a connector that is configured as a standard protocol connector, e.g., a lightning connector or a universal serial bus (USB) connector, to allow connection of different devices to the OA box 1310. In some embodiments, the device interface 1315 is configured to communicate electrical power and/or data with a connected device, allowing the device interface 1315 to charge a connected device as well as transfer data with a connected device, the significance of which is described further herein. To communicate power and/or data, the device interface 1315 may be coupled with the processor 1340 of the flow cytometer 1313. The device interface 1315 may be placed, for example, on a top of the OA box 1310 when the OA box 1310 is standing upright to hold a connected device vertically. While the device interface 1315 is illustrated as a connector that extends away from the associated wall 1311A, in some embodiments the device interface 1315 is a port or similar element that is formed into the associated wall 1311A. In some embodiments, the device interface 1315 can be, for example, a wireless charger that is flush with the associated wall 1311A. It should thus be appreciated that the device interface 1315 may take many forms according to the present invention.

The dock interface 1316 is associated with at least one of the walls 1311B and is electrically coupled with the electrical power source 1314. The dock interface 1316 is configured to electrically couple with a docking interface of a docking station, such as a docking interface 1331 of the docking station 1330, to electrically couple the electrically power source 1314 to the docking station 1330, which may provide electrical power and/or data to the OA box 1310. The dock interface 1316 may be, for example, a port formed into the wall 1311B, as illustrated, or a connector similar to the device interface 1315; in either case, the dock interface may also be a standard protocol connector or port. The dock interface 1316 may be associated with a wall 1311B that is opposite the wall 1311A associated with the device interface 1315, e.g., the dock interface 1316 may be associated with a bottom wall 1311B and the device interface 1315 may be associated with a top 1311A, as will be described further herein.

The handheld device 1320 has a complementary electrical interface 1321 that can electrically couple with the device interface 1315. In other words, if the device interface 1315 is a micro-USB connector, as illustrated, the electrical interface 1321 of the handheld device 1320 can be a micro-USB port to accept the micro-USB connector 1315 and electrically couple the handheld device 1320 to the OA box 1310. The handheld device 1320 may be, for example, a consumer electronic device such as a smart phone or a tablet computer. In some embodiments, the handheld device 1320 is a tablet computer or similar device that is loaded with electronic medical record (EMR) software and allows connection of the handheld device 1320 to the OA box 1310 to transmit medical data, such as flow cytometry tests, to the handheld device 1320 for storage, further analysis, etc. In some embodiments, the handheld device 1320 is a smart phone that is loaded with software that retrieves data signals from the processor 1340 of the flow cytometer 1313 for analysis; in other words, in some embodiments the flow cytometer 1313 is configured to output flow cytometry signals to an external device. It should thus be appreciated that the handheld device can be configured in many different ways, so further description is omitted for brevity.

The docking station 1330 includes a docking interface 1331 that can electrically couple with the dock interface 1316 of the OA box 1310. The docking station 1330 may include a base 1332 that is shaped to rest on a surface, such as a flat surface, and has a cradling region 1333, which may be formed as a recess in the base 1332, to cradle the OA box 1310. The docking interface 1331 may be, for example, a micro-USB or other connector that is disposed in the cradling region 1333 and electrically couples to the dock interface 1316 of the OA box 1310 when the OA box 1310 is cradled by the docking station 1330. The docking station 1330 may also include an electrical converter 1334, such as an AC to DC or AC to AC converter, that is electrically coupled to the docking interface 1331 and can connect to line electrical power and convert the line electrical power into usable electrical power for charging the OA box 1310. In this respect, the docking station 1330 can cradle the OA box 1310 while charging the electrical power supply 1314 of the OA box 1310. In some embodiments, the docking station 1330 can also charge the handheld device 1320 through the cradled OA box 1310 via the electrical power supply 1314 when the docking station 1330 cradles the OA box 1310. In the illustrated embodiment, the handheld device 1320 is held above the cradled OA box 1310 and the docking station 1330 is at partially below the cradled OA box 1310 so the flow cytometry system 1300 is a vertical system. It should thus be appreciated that the docking station 1330 provides a useful place to store and/or charge the OA box 1310.

The flow cytometer system 1300 can be used in a variety of ways. In some embodiments, the OA box 1310 is used as a stand-alone device for analyzing fluid samples to perform, for example, cell counts. In such embodiments, the test results can be stored in the memory 1341 of the OA box 1310 and/or transmitted to an external device. When cradled by the docking station 1330, the flow cytometer 1313 of the OA box 1310 may be used, so long as the sample receiver 1312 can receive and hold a fluid sample when the OA box 1310 is cradled by the docking station 1330, and draw power from the docking station 1330 to operate. When the handheld device 1320 is coupled to the OA box 1310, various functions of the handheld device 1320, such as cellular communication in the case of a smart phone, can be utilized to add functionality to the flow cytometer system 1300. It should thus be appreciated that the flow cytometer system 1300 provided according to the present invention is a flexible, convenient system for performing flow cytometry in various environments, such as a point of care facility.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An optical analysis box for a flow cytometry system, comprising:
    a plurality of connected walls defining a volume;
    a connection interface associated with at least one of the walls and configured to connect with an imaging device;
    a sample receiver configured to hold a fluid sample in the volume; and
    an analysis region having an aperture configured to align with an imaging element of a connected imaging device, the analysis region being positioned such that gravity forces flow of the held fluid sample past the aperture for imaging by the imaging device.

2. The optical analysis box of claim 1, further comprising a flow channel disposed in the volume and configured to allow flow of the fluid sample through the flow channel and past the aperture.

3. The optical analysis box of claim 2, wherein the flow channel is formed in a cartridge interfaced with the sample receiver and holding a fluid sample for analysis.

4. The optical analysis box of claim 1, wherein the connection interface is configured to connect with a handheld imaging device.

5. The optical analysis box of claim 4, wherein the connection interface is a case configured to form a press fit connection with a smart phone.

6. The optical analysis box of claim 1, wherein the sample receiver comprises a push-push mechanism comprising a runway defining a lever channel, a rod bearing on the runway, a lever having a portion placed in the lever channel, a spring urging the runway toward a first position, and a post carried by the runway.

7. The optical analysis box of claim 1, wherein the analysis region has a light aperture formed therein that is spaced from the aperture and configured to align with a light source of a connected imaging device.

8. A flow cytometry system, comprising:
    an imaging device comprising an imaging element, the imaging device being configured to analyze fluid flowing past the imaging element and determine the presence of at least one biological component in the analyzed fluid; and
    an optical analysis box coupled to the imaging device, the optical analysis box comprising:
        a plurality of connected walls defining a volume;
        a connection interface associated with at least one of the walls and connected with the imaging device;

a sample receiver holding a fluid sample in the volume; and an analysis region disposed in the volume, the analysis region having an aperture aligned with the imaging element such that gravity forces the held fluid sample to flow past the aperture for imaging by the imaging device.

9. The flow cytometry system of claim 8, further comprising a flow channel disposed in the volume and configured to allow flow of the held fluid sample through the flow channel and past the aperture.

10. The flow cytometry system of claim 9, wherein the flow channel is formed in a cartridge interfaced with the sample receiver and holding the fluid sample.

11. The flow cytometry system of claim 8, wherein the imaging device is a handheld imaging device.

12. The flow cytometry system of claim 11, wherein the handheld imaging device is a smart phone.

13. The flow cytometry system of claim 8, wherein the sample receiver comprises a push-push mechanism comprising a runway defining a lever channel, a rod bearing on the runway, a lever having a portion placed in the lever channel, a spring urging the runway toward an unloaded position, and a post carried by the runway.

14. The flow cytometry system of claim 8, wherein the analysis region has a light aperture formed therein that is spaced from the aperture and aligned with a light source of the imaging device.

15. The flow cytometry system of claim 8, further comprising a pair of conductive plates held in the volume, coupled to a voltage source and configured to generate an electric field that redirects biological components in the fluid sample that are flowing toward the aperture.

16. A flow cytometry system, comprising:
an optical analysis box comprising:
a plurality of connected walls defining a volume;
a sample receiver configured to hold a fluid sample in the volume;
a flow cytometer placed in the volume and configured to analyze a held fluid sample and determine the presence of at least one biological component in the analyzed fluid;
an electrical power source electrically coupled to the flow cytometer;
a device interface associated with at least one of the walls and configured to electrically couple with an electrical interface of a handheld device; and
a dock interface associated with at least one of the walls, electrically coupled with the electrical power source, and configured to electrically couple with a docking interface of a docking station.

17. The flow cytometry system of claim 16, wherein the dock interface is electrically coupled with the electrical power source.

18. The flow cytometry system of claim 16, further comprising a handheld device having an electrical interface electrically coupled with the device interface and a docking station cradling the optical analysis box and having a docking interface electrically coupled with the dock interface.

19. The flow cytometry system of claim 18, wherein the docking station is configured to charge the handheld device through the cradled optical analysis box.

20. The flow cytometry system of claim 18, wherein the handheld device is held above the cradled optical analysis box and the docking station is at least partially below the cradled optical analysis box.

* * * * *